Feb. 19, 1935.　　　　G. W. BORNMAN　　　　1,992,116
AGRICULTURAL IMPLEMENT
Filed Sept. 25, 1933　　5 Sheets-Sheet 1
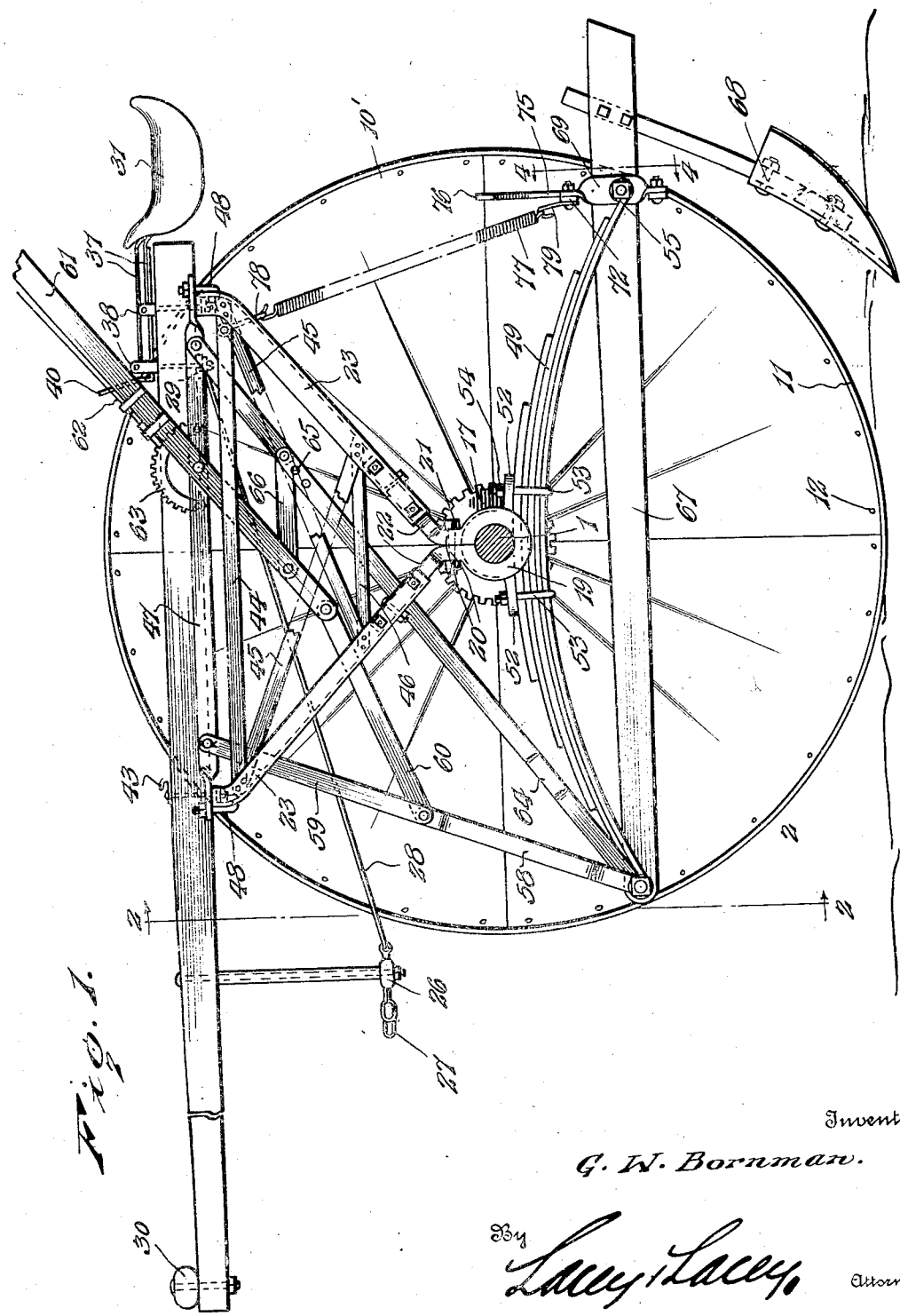
Inventor
G. W. Bornman.
By Lacey & Lacey, Attorneys

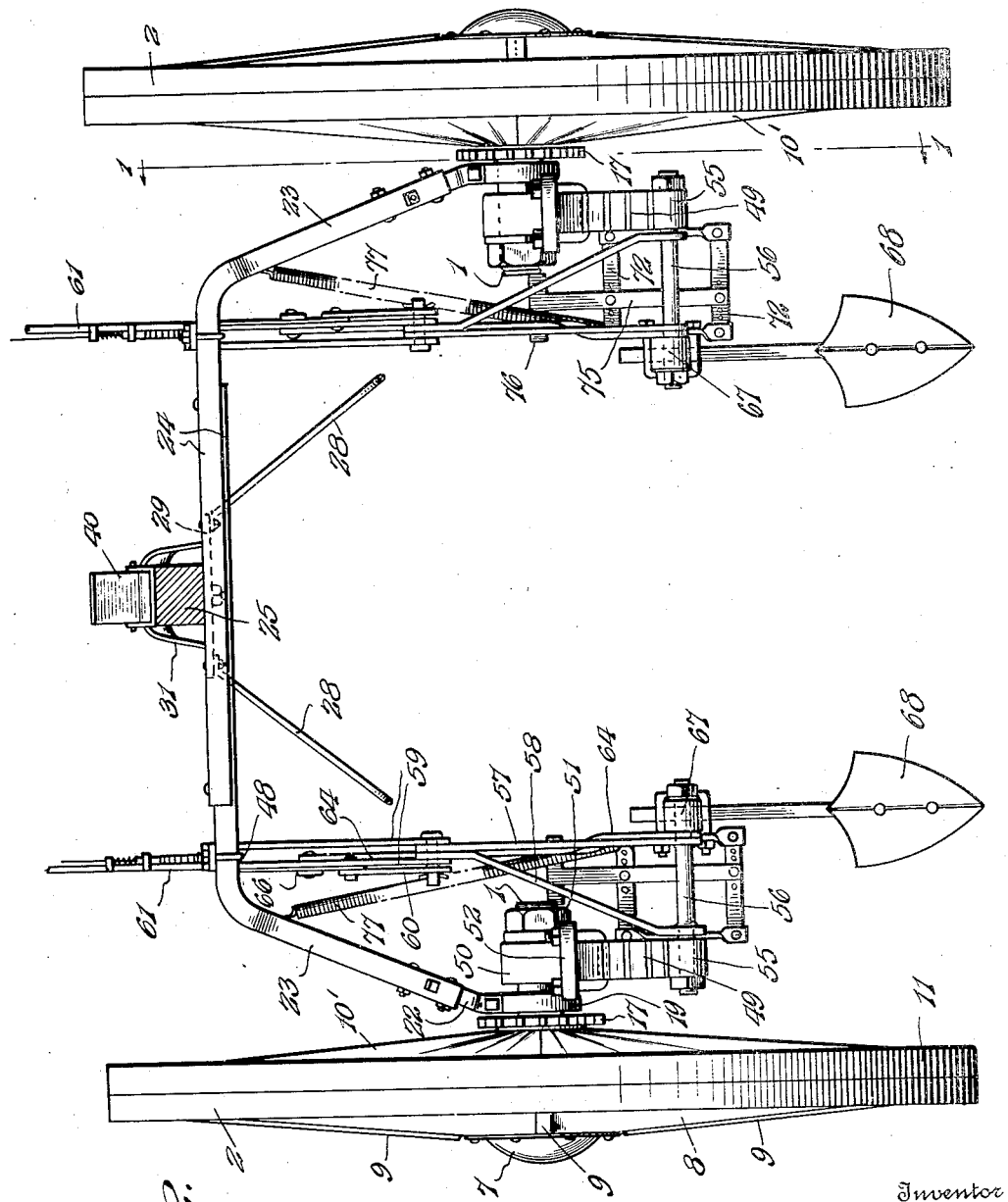

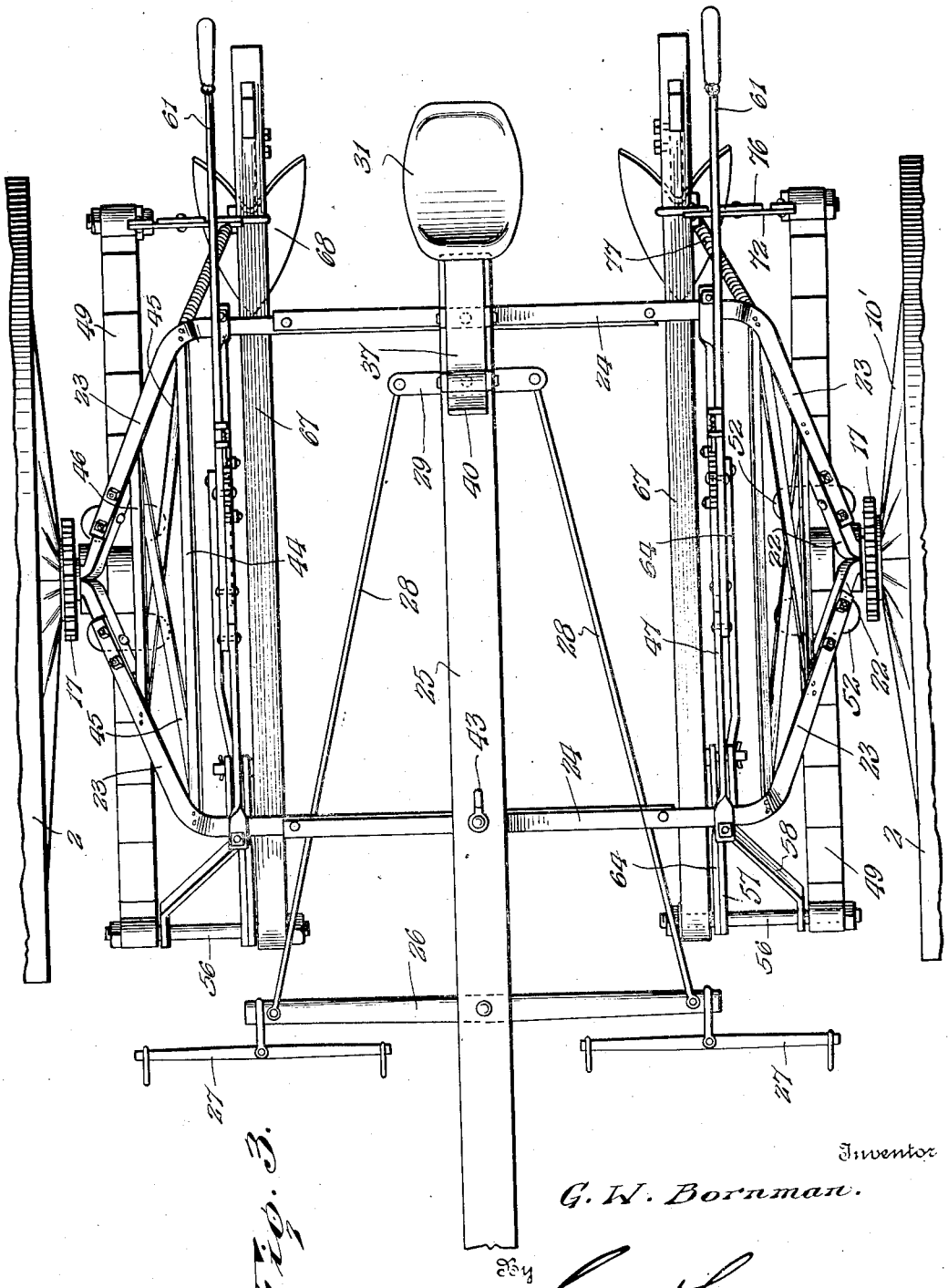

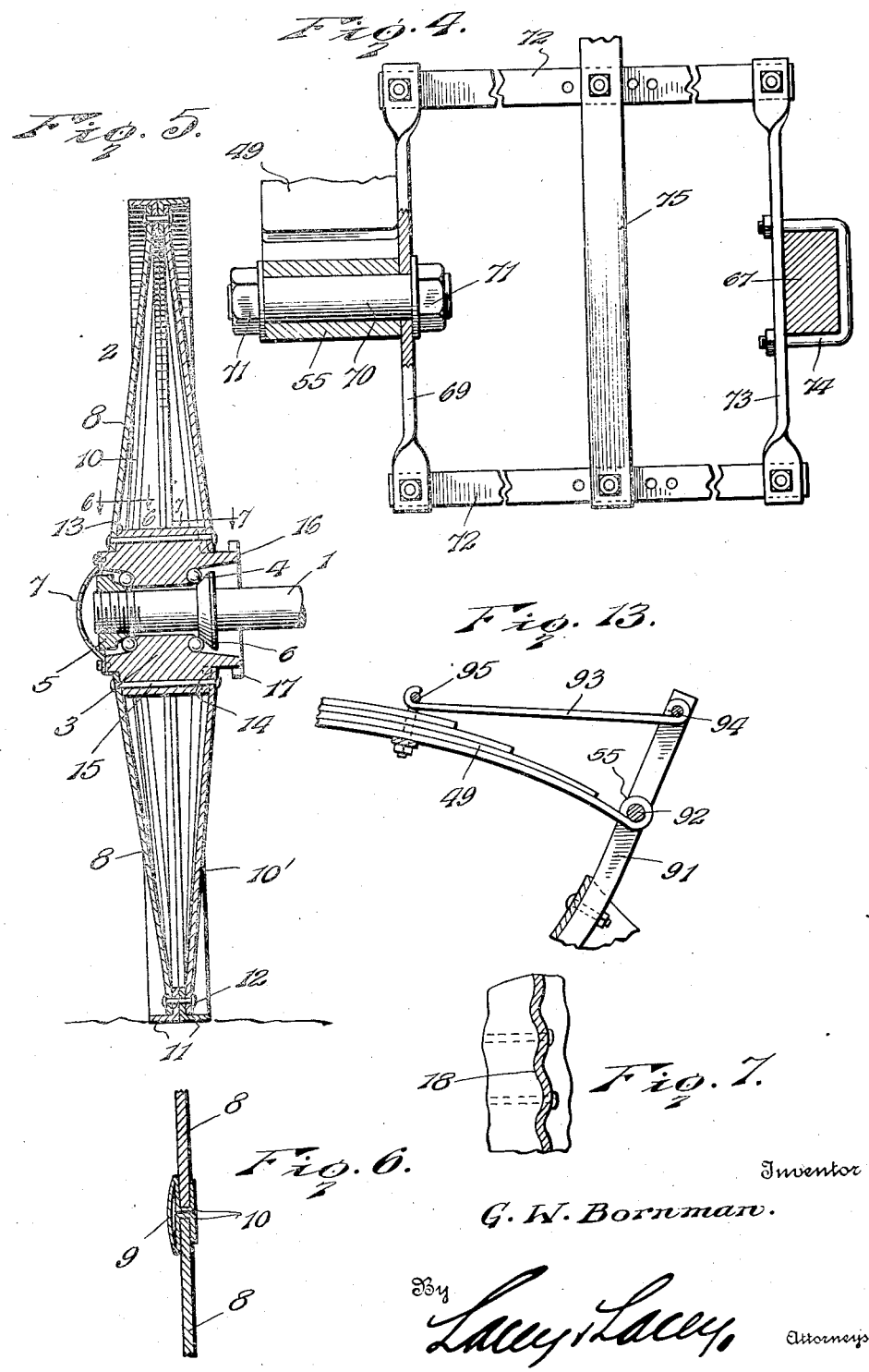

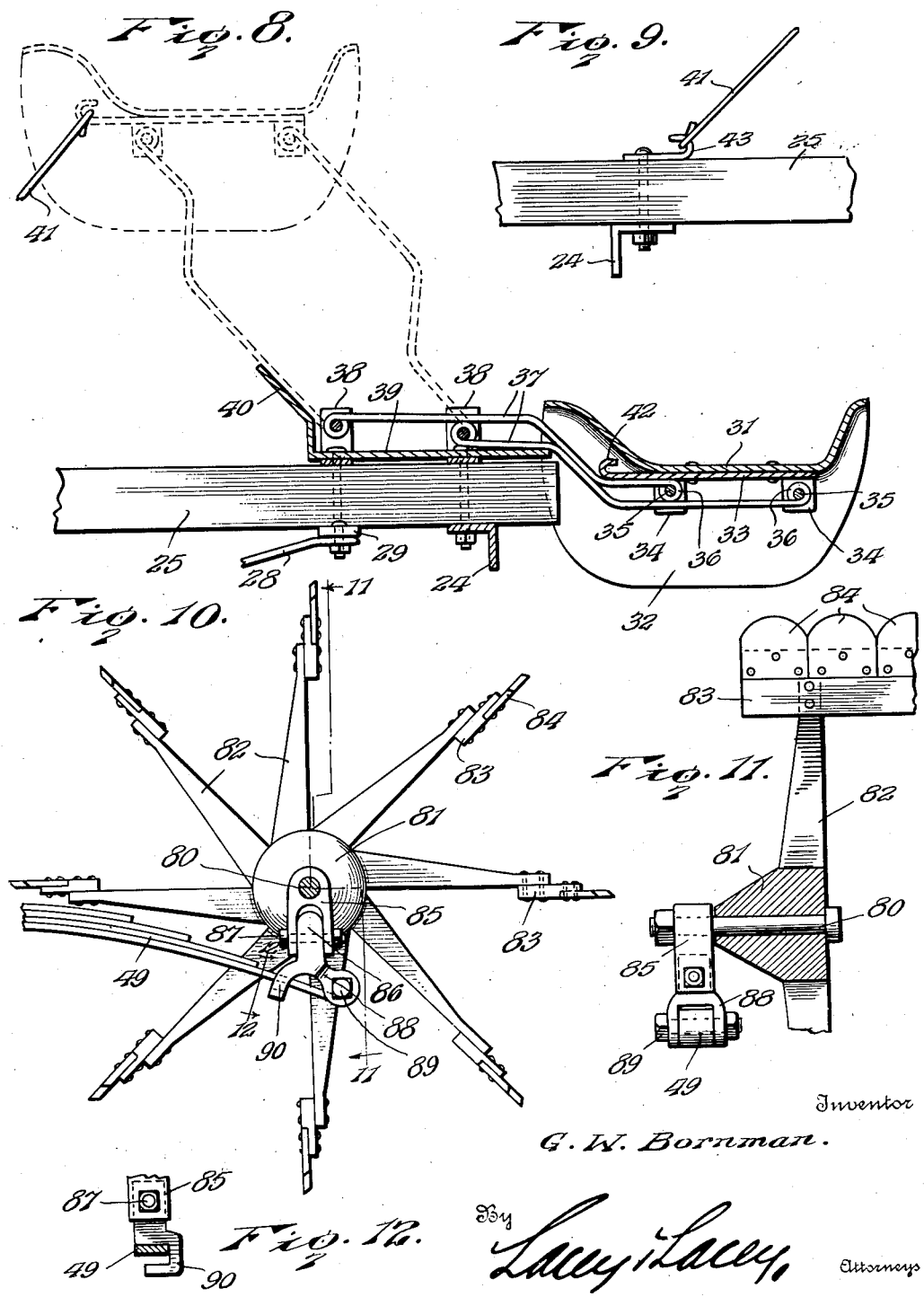

Patented Feb. 19, 1935

1,992,116

UNITED STATES PATENT OFFICE 1,992,116

AGRICULTURAL IMPLEMENT

Graham W. Bornman, Clarksdale, Miss.

Application September 25, 1933, Serial No. 690,926

3 Claims. (Cl. 97—234)

This inventon has for one object the provision of a novel sulky or wheeled frame to which various ground treating implements may be attached, and another object of the invention is to provide a sulky of inexpensive construction which will be easy riding and to which various kinds of agricultural implements may be attached. The invention also has for an object the provision of novel means for adjusting the sulky so that any desired pressure may be exerted through the ground engaging implements, and another object is to provide a novel means for attaching cultivators or plows to the sulky. The invention also has for an object the provision of wheels of strong and durable construction which will effectually resist the accumulation of mud thereon and which will firmly support the sulky frame. The invention also provides a novel seat mounting whereby the operator may ride in an upper or a lower position according to the work that is being done, and a further object is to provide a novel construction of stalk cutter and a novel mounting for the stalk cutter upon the sulky. These various objects and other objects which will appear incidentally in the course of the following description are attained in such an implement as is illustrated in the accompanying drawings, and the invention resides in certain novel features which will be particularly pointed out in the appended claims.

In the drawings,

Figure 1 is a side elevation of an implement embodying the present invention, the near wheel being removed and the axle being shown in section, Figure 2 is a front elevation, with the tongue in section, on the line 2—2 of Figure 1, the line 1—1 in Figure 2 representing the plane of the section shown in Figure 1, Figure 3 is a plan view of the implement, Figure 4 is an enlarged detail section on the line 4—4 of Figure 1, Figure 5 is a vertical diametric section through one of the wheels, Figure 6 is a detail section on the line 6—6 of Figure 5, Figure 7 is a detail section on the line 7—7 of Figure 5, Figure 8 is a view, partly in side elevation and partly in section, of the seat and its mounting, Figure 9 is a detail showing a portion of the seat mounting which does not fully appear in Figure 8, Figure 10 is an end elevation of the stalk cutter, with the axle in section, Figure 11 is a detail view, partly in elevation and partly in section, on the line 11—11 of Figure 10, Figure 12 is a detail section on the line 12—12 of Figure 10.

Figure 13 is a view showing a cultivator blade mounted at the rear end of the elliptical spring.

The sulky of the present invention includes a pair of short axles 1 which are arranged in alinement and support an arched frame, the space below the top of the arch and between the axles being left open and clear for the location of ground engaging elements. The wheels 2 are mounted upon the respective axles, at the outer ends thereof, and comprise hubs 3 which are mounted upon the axles by anti-friction bearings, as indicated at 4 in Figure 5. The hub is retained upon the axle by an outer nut 5, which constitutes a cone element of the outer bearing, and an inner cone 6 which is fixed upon the axle to form a part of the inner bearing for the hub. A cap 7 is fitted over the nut 5 and is secured to the outer end of the hub in any approved or preferred manner. The outerside of each wheel is formed by four pieces of sheet metal of quadrantal form. The metal plates 8 will form a seam at their meeting radial edges, as shown most clearly in Figure 6, and these seams are closed and the sheets are held together by a molding 9 formed by crimping a strip of sheet metal to provide central flanges 10 which are inserted through the seam and then spread to bear closely against the inner surfaces of the sheet metal plates. The plates are thus held together and the wheel given an attractive finish, while the entrance of dirt to the interior of the wheel is prevented. The inner side of the wheel is also formed of sheet metal plates 10' trimmed to conform to the circumference of the wheel and the inner end of the hub and converged from the hub toward the outer side of the wheel, as clearly shown in Figure 5. The tread surface of the wheel is provided by two angle bars 11 which are placed together and have their inner webs inserted between the outer edges of the sides of the wheel, as clearly shown in Figure 5. Rivets or bolts, indicated at 12, are then inserted through the edges of the side plates and through the abutting flanges of the tread members so that the parts will all be firmly secured together. The inner edges of the outer plates 8 are arcuate so as to conform to the circumference of the hub and are firmly secured against an annular shoulder 13 formed on the hub, while the plates 10', constituting the inner side of the wheel, are also fitted against an annular shoulder 14 on the hub, as shown, long bolts or rivets 15 being inserted through the shoulder portion of the hub and through the inner edges of the side plates so that the plates will be firmly secured to the hub. The hub is provided with an extension 16, at its inner end, which passes through the central opening of the inner side of the wheel and has gear teeth 17 formed thereon about which may be engaged a sprocket chain when a seating machine or platter is to be connected with the sulky. As shown in Figure 7, the inner side plates 10' are corrugated, as indicated at 18, so that they may engage with and fit closely against a correspondingly shaped surface of the shoulder 14. These corrugations are quite deep at the hub but diminish in depth toward the outer edge of the wheel and gradually disappear. This construction will effectually resist all tendency of the plate to shift upon the hub so that the plates are not apt to work loose. The corrugations at the meeting edges of adjacent plates may overlap to close the seam so that the molding employed on the outer side of the wheel may be dispensed with.

At the inner side of each wheel, a clamp 19 is fitted on the axle and said clamp is formed of a bar having its central portion formed into a split ring which will snugly encircle the axle. The bar is bent radially at the split in the ring to form the lugs 20 through which a securing bolt 21 may be inserted to securely bind the ring upon the axle, and from the ends of these lugs, arms 22 diverge upwardly, said arms being inclined or tilted inwardly or away from the wheel, as shown in Figure 2. To each arm 22 there is secured one end of a frame bar 23 which is preferably an angle bar and is bent at about midway its length so as to produce an arm 24 which will extend inwardly at the front and the rear of the frame, respectively. As shown clearly in Figures 2 and 3, the arms 24, at the front and the rear of the frame, overlap and they are provided with a plurality of openings through which securing bolts are passed so that the frame may be adjusted to any desired width. A draft tongue 25 is bolted or otherwise firmly secured upon the arms 24, which form the tops of the arched members of the frame, and extends forward from the frame to a desired length. In the illustrated development of the invention, a double tree 26 is mounted upon the tongue in advance of the frame and single trees 27 are carried by the ends of this double tree. Connecting rods 28 are pivoted to the double tree 26, adjacent the ends thereof, and extend rearwardly therefrom to an anchor bar or stabilizer 29 which is pivotally mounted upon the tongue adjacent the rear end of the same. A neck yoke 30 is also provided adjacent the front end of the draft tongue. It must be understood, however, that, while I have shown and so specifically described means for hitching draft animals to the sulky, the machine may be coupled to a tractor and drawn over the field by the tractor or other self-propelled instrumentality.

A seat 31 is provided which may be formed of pressed steel and in shape closely approximates an ordinary riding saddle, thereby providing wings or side flaps 32 which will protect the operator from wet cotton plants when the sulky is drawing a cotton chopper through plants which have attained some height. The saddle is secured upon a base bar 33 having depending lugs 34 and through said lugs are fitted bolts or rivets 35 about which are pivotally engaged eyes 36 on the rear ends of arms 37 which are preferably formed of resilient metal bars. It will be noted that the spring arms are independently pivoted to the saddle at points adjacent the front and rear thereof, respectively, and the front ends of these arms are connected in a similar manner with the front and rear brackets 38 secured upon the upper side of the draft tongue at the rear end of the same. These brackets or clips 38 are secured to the tongue by bolts passing therethrough and the rear bracket is secured by the same bolt which secures the tongue upon the rear arched arm 24. A stop member or rest has its base 39 inserted through the brackets 38 and secured thereto by the same bolts which secure the brackets upon the tongue, as clearly shown in Figure 8, while the upstanding member of this rest rises from the front end of the base and is disposed in alinement with the arms 37 and is inclined upwardly and forwardly, as shown at 40. When the machine is being used for cultivating, the saddle is disposed in the position shown in full lines in Figure 8 at the rear of the draft tongue and the operator will support his feet upon foot rests provided upon the cultivator. When the machine is drawing a stalk cutter over the field, the saddle will be swung upwardly and forwardly, as indicated by dotted lines in Figure 8, and the operator will then be supported above the plants and may rest his feet upon the sides of the arched frame so that he will be protected from dew or other moisture which may be upon the plants. When the saddle is disposed in the upper position, the forward arm 37 will bear directly upon the rest 40, as clearly shown, and to further support the saddle and guard against accidental or premature rearward movement of the same, a stay-rod 41 is provided with hooks at its opposite ends, the hook at one end being engaged with a hook 42 formed at the front end of the base 33 of the saddle, while the hook at the front end of the rod is engaged with a hook 43 secured upon the draft tongue, as clearly shown in Figure 9.

The frame, provided by the several bars 23 with their overlapping arms 24, is thoroughly reinforced and given the desired rigidity by a horizontal brace 44, secured to and extending between the upper ends of said members at the two sides of the machine, and by diagonally disposed braces 45 which are each secured at one end to the upper end or corner of a side member 23 and at the opposite end to the mating side member, near the respective holding arm 22. An additional brace 46 is secured to and extends between the arms 23, at the lower ends of the braces 45, and an additional bar 47 extends between the arms 24 above the brace 44. This last named bar 47 has its ends disposed flat upon the arms 24 and clips 48 are engaged through the ends of said bar 47 and hooked under the depending flanges or webs of the arms 24. Elliptical springs 49 are secured upon the respective axles at the inner sides of the clamps 19. To secure the springs upon the respective axles, a circular body 50 is fitted on the axle at the inner side of the clamp, as shown in Figure 2, and is retained on the axle by a nut 51. The axle-engaging body 50 is provided with lugs or flanges 52 at its underside which conform to and rest upon the elliptical springs, and clips 53 are engaged through these lugs or flanges and around the spring so as to firmly support the spring from the axle-engaging body.

In assembling the parts, care should be taken so that the nuts 54 are not turned home so tightly as to interfere with the free action of the spring. The springs are provided with eyes 55 at their ends and through said eyes, at the front ends of the springs, are engaged round rods or bars 56 which constitute the bases of right triangular couplings, the sides of the couplings being defined by bars 57 and the bracing members 58. The upper ends of these triangular couplings are pivoted to and between the lower ends of straps 59 which extend upwardly and are pivoted upon the bar 47 adjacent the front end of the latter. At the joint between the straps 59 and the couplings 57 there is pivoted the front end of a link 60 which extends rearwardly and somewhat upwardly and is pivoted at its rear end to the lower end of a hand lever 61 fulcrumed upon the bar 47 and equipped with a latch 62 adapted to engage a rack 63 secured upon the bar 47 concentric with the fulcrum of the lever so that the lever may be locked in any set position. A long brace 64 is pivoted at its lower end upon the base rod 56 of the triangular coupling and at its upper end to the bar 47 adjacent the rear end of the latter. This brace 64 is divided at a point near its upper rear end and the two sections are pivoted together, a plurality of openings 65 being provided so that the brace may be elongated or shortened, as may be deemed desirable under any given conditions. Pivoted in the joint thus provided is the rear end of a link 66 which has its front end pivoted to the lever 61, as clearly shown in Figure 1. If the lever be rocked forwardly, the front end of the spring 49 will be rocked upwardly, while the rear end thereof will be rocked downwardly and any implement which may be connected with the spring will consequently be caused to set deeper in the soil.

In Figures 1, 2 and 3, I have shown a plow or cultivator carried by each spring 49. The front end of the plow beam 67 is hung upon the rod 56, while the rear end thereof projects rearwardly beyond the spring and is shown as equipped with a plow shovel 68. The rear end portion of the plow beam is supported by the rear end of the spring 49 and is connected therewith by a coupling frame, shown in detail in Figure 4. This frame includes a bar 69 which is engaged over the inner end of a bolt 70 inserted through the eye 55 at the rear end of the spring, the bolt being secured in place by nuts and washers, indicated at 71, in the usual manner, and the inner nut serving also to secure the frame bar 69 against the side of the spring. The bar 69 extends above and below the spring and its ends are connected by upper and lower bars 72 with a second upright side bar 73, a clip 74 being secured in this bar 73 and around the plow beam so that the plow beam will be supported by the spring. Secured to the bars 72, between the ends thereof, is a standard 75 which rises above the coupling frame and has a cross bar 76 formed on or secured to its upper end to constitute a foot rest. A retractile spring 77 is engaged at one end with a hook 78 carried by the sulky frame, at the corner of the same, the lower end of the spring being engaged with a hook 79 secured to the upper bar 72. It will now be understood that the operator, seated on the saddle 31, will rest his feet upon the foot rests 76 and may easily exert sufficient pressure upon the foot rests to hold the shovels or other instruments at the desired depth in the ground. When it is desired to remove the implements from the ground, the operator will release the pressure upon the foot rests whereupon the springs 77 will at once contract and lift the implements from the soil. It will be readily understood from the drawings that the parts which have been thus described in detail are duplicated at the two sides of the frame and the machine may consequently act upon two rows simultaneously. It will be noted that the plow beams at their front ends are offset from the springs. When the plows or cultivators are under draft, the entire load is on the hitches or couplings at the front ends of the beams and a strong bracing structure is desirable. The arrangement of links and braces employed by me produces a triangular bracing frame which will effectually resist all strain concentrated at the point 56.

In Figures 10, 11 and 12, I have illustrated a stalk cutter of novel construction which may be connected with the sulky. This stalk cutter comprises alined axles 80 upon which hubs 81 are rigidly secured in any desired manner, these hubs carrying spokes or radial arms 82 to the outer ends of which blades 83 are secured, the blades 83 serving as connections between the spokes at the two ends of the stalk cutter so that the space between the two sets of spokes will be entirely clear and will permit the escape of stalks and trash which might tend to clog the action of a closed drum. The blades 83 are rabbeted along their outer edges and in the rabbets or recesses teeth 84 are secured so that as the drum rotates through the engagement of the teeth with the surface of the ground, the teeth will pass through stalks and vines so as to cut up the same and facilitate the disposition thereof. The outer ends of the axles 80 are fitted rotatably in boxes 85 which are forked on their undersides to span the upstanding body 86 of a clip or bracket which is carried by the rear end of the spring 49. A bolt 87 is inserted through the ends of the fork and through the body 86 so that the box and the body will be secured together and the axles will be supported by and above the end of the spring. The clip or bracket, of which the body 86 is a part, includes a rearwardly extending yoke 88 which spans the eye at the rear end of the spring 49 and is provided with openings through which the bolt 89, inserted through the eye of the spring, passes so that the bracket or clip will be secured to the spring and retained thereon. In advance of the fork, a depending hook 90 passes around the edge of the spring and engages under the same, as clearly shown in Figure 12, the bill of this hook constituting a stop to limit upward movement of the hook but permitting some play so that the stalk cutter may ride over projections which it cannot penetrate, such as rocks or very large and hard roots. The several teeth 84 may be readily removed so that broken teeth may be replaced with new teeth when such action is necessary.

I also contemplate providing an extra cultivator or plow shovel to be carried directly by the end of the elliptical spring so that the machine may act upon three rows of plants at one time or may be used to clear out the middle of rows which have been divided, as by the use of a cotton chopper. When this additional implement is provided, the shank 91 thereof will be carried by a bolt 92 engaged through the eye 55 of the spring and a link or brace 93 will be provided, the rear end of the link being engaged with a bolt or other member 94 on the shank and the front end thereof being engaged with a clip 94 secured upon the spring, as shown clearly in Figure 13.

It is to be particularly noted that my improved sulky is of such form that it will easily span a row of plants and will permit cultivation to be performed at both sides of a single row or, if the frame be adjusted to a wide spread, may be caused to act upon more than one row at a time. The frame is thoroughly braced so that it will effectually withstand the rough usage to which it is subjected and notwithstanding that it is operating in rough ground, the springs which carry the ground-engaging implements will impart easy riding qualities to the frame.

Having thus described the invention, I claim:

1. In an agricultural implement ground wheels, axles upon which the wheels are rotatably mounted, a frame secured upon the axles and comprising upwardly diverging front and rear arched members having their upper portions connected between the axles, braces connecting the front and rear diverging bars at the two sides of the frame, a draft tongue secured upon the arched bars, and springs carried by the axles and carrying ground-engaging instrumentalities.

2. In an agricultural implement, ground wheels, alined short axles upon which the wheels are mounted, clamps secured upon the respective axles and having upwardly diverging arms on their upper sides, frame bars secured to said arms and extending forwardly and rearwardly respectively and having their upper portions extending inwardly between the wheels and adjustably secured together in overlapping relation whereby the span of the frame may be adjusted, springs carried by and extending forwardly and rearwardly from the respective axles, means for connecting ground-engaging instrumentalities to the rear ends of the springs, couplings connected with the front ends of the springs and adapted to support ground-engaging instrumentalities, links connecting the upper ends of said couplings with the upper portions of the frame, levers mounted on the sides of the frame, and connections between said levers and the couplings whereby to raise and lower the rear ends of the springs.

3. In an agricultural implement, ground wheels, alined axles upon which the wheels are rotatably mounted, clamps secured upon the axles at the inner sides of the wheels, front and rear frame bars secured to said clamps and diverging upwardly therefrom, the upper portions of the frame bars extending inwardly in overlapping relation and being secured together, braces extending between the upwardly diverging frame bars, springs carried by the axles and extending forwardly and rearwardly therefrom, couplings engaged with the front ends of the springs and constituting supports for ground-engaging instrumentalities, links pivoted to the upper ends of said couplings and to one of the braces between the frame bars, a jointed brace extending between the lower ends of said couplings and the upper rear corners of the frame, hand levers fulcrumed upon the frames, and links, one connecting the lower end of a lever with the upper end of the coupling and another link connecting the jointed brace with the lever near the lower end of the same.

GRAHAM W. BORNMAN. [L. s.]